(12) United States Patent
Maltsev et al.

(10) Patent No.: US 7,899,129 B2
(45) Date of Patent: Mar. 1, 2011

(54) WIRELESS PERSONAL AREA NETWORK COMMUNICATION SYSTEMS, APPARATUS AND METHODS WITH FAST ADAPTIVE BEAMFORMING

(75) Inventors: Alexander Maltsev, Nizhny Novgorod (RU); Roman Maslennikov, Nizhny Novgorod (RU); Alexey Khoryaev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 11/853,579

(22) Filed: Sep. 11, 2007

(65) Prior Publication Data
US 2009/0067539 A1 Mar. 12, 2009

(51) Int. Cl.
*H04B 7/02* (2006.01)
(52) U.S. Cl. ............... 375/267; 375/260; 375/295; 375/343
(58) Field of Classification Search ........... 375/267, 375/296, 260, 343, 295
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 7,426,175 B2 | * | 9/2008 | Zhuang et al. | 370/203 |
| 7,602,855 B2 | * | 10/2009 | Koo et al. | 375/267 |
| 2005/0265275 A1 | * | 12/2005 | Howard et al. | 370/328 |
| 2008/0204319 A1 | * | 8/2008 | Niu et al. | 342/368 |

* cited by examiner

*Primary Examiner*—Shuwang Liu
*Assistant Examiner*—Dhaval Patel
(74) *Attorney, Agent, or Firm*—James S. Finn

(57) ABSTRACT

An embodiment of the present invention provides a method for communicating in a wireless personal area network, comprising using adaptive beamforming configured for a low-rate mode for reliable low-rate communications and a high-rate mode for high-rate communications and using a fast algorithm to perform antenna beamforming for the high rate mode, wherein the fast algorithm includes training performed on a block-by-block basis with decision feedback from a receiver (RX) to a transmitter (TX) about the usefulness of further training stages.

24 Claims, 4 Drawing Sheets

WIRELESS PERSONAL AREA NETWORK COMMUNICATION SYSTEMS, APPARATUS AND METHODS WITH FAST ADAPTIVE BEAMFORMING

BACKGROUND

The millimeter-wave (mmWave) WPAN communication systems operating in the 60 GHz frequency band are expected to provide several Gbps throughput to distances of about 10 m and will be entering into the service in a few years. Currently several standardization bodies (IEEE 802.15.3c, WirelessHD SIG, ECMA TG20) consider different concepts of the mmWave WPAN systems to define the systems which are the best suited for the multi-Gbps WPAN applications.

Inherent in any wireless communication systems is the need for improved throughput and reliability. Thus, a strong need exists for techniques to improve mmWave wireless personal area networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
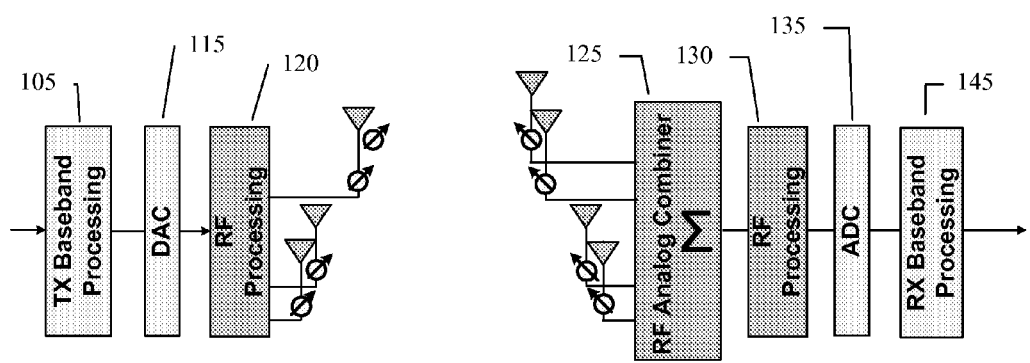
FIG. 1 illustrates a block diagram of the TX and RX communication devices with RF beamforming systems of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, or even high definition television signals in a PAN.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

An embodiment of the present invention provides a mmWave wireless personal area network (WPAN) communication system with adaptive beamforming exploiting a low-rate mode for reliable low-rate communications and also high-rate mode for high-rate communications and including a novel fast algorithm to perform antenna beamforming for high rate mode. The present invention provides many advantages over other proposed mmWave WPAN systems with beam steerable directional antennas support. The algorithm according to one embodiment of the present invention is made on the block-by-block basis which allows the use of only a few stages for most of the practical cases but also being able to have a full long training for some specific cases which may occur rarely. So the required training time varies depending on the channel characteristics and required training quality and on average this time may be significantly shorter than the training time for algorithms always exploiting exhaustive search.

The present invention may obtain all the information about the frequency selective channel matrix and does not make assumptions about the space-time characteristics of the propagation channel as, for example, it is done in other methodologies. The estimation of the full channel information allows the application of different optimal and simplified suboptimal algorithms for antenna weight vectors calculation at the RX side depending on the complexity of the device.

An embodiment of the present invention enables directional antennas support. The support of directional antennas is important for mmWave WPAN systems because the high frequency of 60 GHz allows miniature high-gain antenna implementation and high antenna gains are required to maintain sufficient link budget for large signal bandwidth (~2 GHz) and limited transmission power.

Examples of types of the antenna systems which may be supported by the mmWave WPAN system include, but are not limited to:

1. Phased antenna array where inputs and outputs to/from antenna elements may be multiplied by the weight (phase) vector to form TX/RX beams.

2. Sectorized antenna which can be switched to one of the several beams.

3. Sectorized antenna where inputs/outputs to/from several sectors can be combined with some weights.

4. Non-switched directional or omni-directional antenna.

Communication between devices with any type of antenna configurations need to be supported within one piconet network. Devices with the beam steerable antennas require the optimal adjustment of TX and RX antenna systems (beamforming) before the start of data transmission. The requirements to the quality of the antenna system adjustment are different for low-rate and high-rate modes. Because of the big redundancy (spreading) low-rate modes may perform sufficiently well with the coarse antennas adjustment, while the high-rate mode requires fine antenna adjustment for the maximum performance (throughput).

The goal of the low-rate mode beamforming is to establish a reliable low-rate link between two arbitrary nodes to allow exchange of the MAC commands and low-rate data—although the present invention is not limited in this respect. For this purpose the beamforming may be restricted to the case of the best TX-RX antenna sectors selection without additional precise adjustment of the phase vectors (i.e. in this mode the phased antenna array may be configured as a sectorized antenna with a few sectors/beams). The beamforming in the low-rate mode is assumed to be done prior to the start of the high-rate beamforming process.

Beamforming for High-Rate Mode

The beamforming for high-rate mode has to be done with goal of the link performance maximization (not just establishment of the reliable low-rate link). For sectorized antennas the high-rate mode beamforming also consists of the best TX and RX sectors/beams selection as for low-rate mode. But for the phased antenna arrays (and sectorized antenna where the sectors can be combined with some weights) the precise adjustment of the weights has to be done during the high-rate mode beamforming (not just selection of the best sector) to achieve the maximum performance.

It should be stressed that the beamforming for 60-GHz communication systems is implemented in RF to be able to have a large number of antenna elements to provide a highly directional antenna pattern. The block diagram of the TX and RX communication devices is schematically shown generally as 100 of FIG. 1. TX may include TX baseband processing 105, digital to analog conversion 115 and RF processing 120. RX may include RF analog combiner 125, RF processing 130, ADC 135 and RX baseband processing 145. The RF beamforming uses the single weight vector for the whole frequency selective channel which is different from baseband beamforming (typically used in Wi-Fi and WiMAX systems) where the unique weight vector is used for every or small set of subcarriers.

To realize optimal RF beamforming in the general case the information about the channel matrix (between TX-RX antenna elements) for all channel bandwidth is required. If such information is available then the weight vectors optimal for some criterion may be calculated (e.g. weight vectors maximizing the integral post-processing capacity over the whole bandwidth). For this reason the use of a wideband signal for channel sounding is required as it provides full ready-to-use information about wideband channel transfer functions (channel matrix). Such wideband signal may be a time-domain generated signal with good autocorrelation properties (narrow autocorrelation function) if the channel matrix estimation is done in the time domain. In the other case such signal may be a frequency domain generated OFDM signal if the channel matrix estimation is done in the frequency domain.

Mathematical Model of the Antenna System

Figure 2:
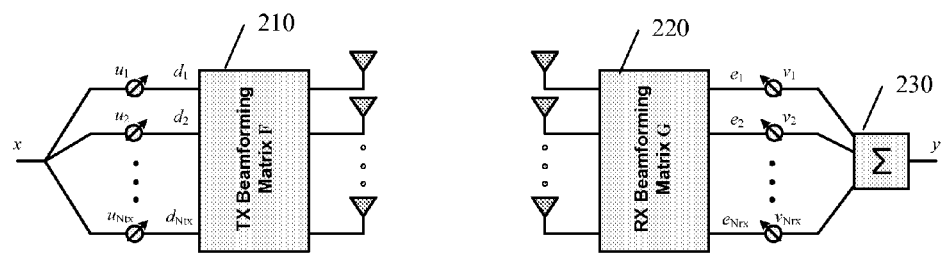
FIG. 2 shows a mathematical model of the TX and RX antenna systems of an embodiment of the invention.

To describe the beamforming procedure introduced in some embodiments of the present invention, it is convenient to introduce the mathematical model for baseband signals of the considered system shown generally as 200 of FIG. 2, with TX beamforming matrix F shown at 210 and RX beamforming matrix G at 220, and summation at 230. It is required to estimate channel transfer functions between all TX and RX antenna elements or, equivalently, between TX antenna system inputs $d_i$ and RX antenna system outputs $e_j$ which are defined as follows. The TX antenna system inputs $d_i$ are connected with the TX antenna elements through TX beamforming matrix F and the RX antenna element outputs are connected with the outputs of the RX antenna system $e_j$ through the RX beamforming matrix G. The TX and RX antenna weight vectors u and v are applied to the inputs of the TX and the outputs of the RX antenna systems respectively.

So the received signal y can be expressed through the transmitted signal x by the following equation:

$$y = v^H G^H H F u x$$

where H is the frequency non-selective channel transfer matrix. For the frequency selective channel the above equation will be true for every subcarrier of the OFDM system and also, with some modifications, for SC system. The matrices F and G are composed of the vectors $f_1 \ldots f_{Ntx}$ and $g_1 \ldots g_{Nrx}$ respectively where these vectors may be considered as weight vectors for elementary antenna patterns or beams constructed from the antenna patterns of the single antenna elements. These elementary antenna patterns are combined into the final TX and RX antenna patterns using the TX weight vector u and the RX weight vector v. It should be noted that the TX beamforming matrix may not be known to the RX and also RX beamforming matrix may not be known to the TX to perform the training. The general approach of using beamforming matrices allows application of the arbitrary beamforming basis (e.g. Butler, Hadamard, identity and other) for antenna system training.

The sectorized antenna systems with the single sector selection and sectorized antenna system with sectors combining may be considered as a special case of the suggested mathematical model. For this case the beamforming matrices F and G are identity matrices but every antenna element has its own antenna pattern (beam) which may be mathematically taken into account by its inclusion into H matrix. For simple switched sectorized antenna only beamforming vectors u and v with one element equal to one and other elements equal to zero may be used.

High-Rate Mode Beamforming Training Structure

It is assumed that during the proposed training procedure only one TX antenna system input $d_i$ and only one RX antenna system output $e_j$ are used at one time instance. So the training signal is transmitted using only the TX antenna beam $f_i$ and is received using only the RX antenna beam $g_j$. The TX antenna system inputs $d_i$ and RX antenna system outputs $e_j$ are consequently changed during the training period to scan the spatial channel matrix.

The signals used during the training may be any type of the wideband signals like OFDM symbols, PN-sequences, chirp signals and others. Different training signals may be also used for transmission from different TX antenna system inputs so that the TX antenna system input index $d_i$ may be identified at the RX side. The transmitted training signals can be repeated (i.e. the same signal transmitted several times) so that RX is able to use autocorrelation scheme for initial signal detection and synchronization.

Figure 3:
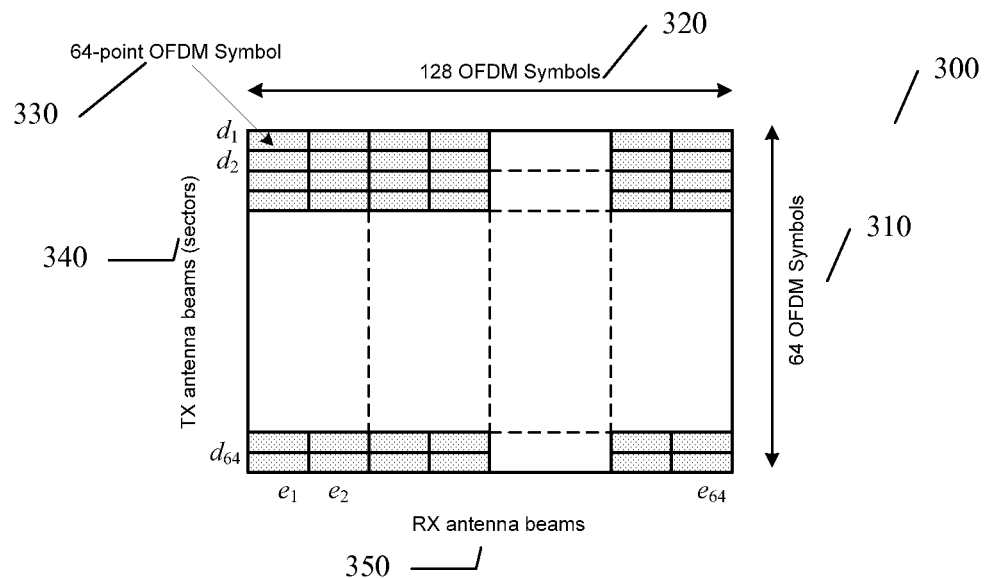
FIG. 3 depicts the structure of the full training for an antenna system in an embodiment of the present invention.

To get the full channel knowledge it is required to perform training between all the pairs of the TX antenna system inputs $d_i$ and RX antenna system outputs $e_j$. For example, if the number of the TX antenna system inputs and RX antenna system outputs is equal to 64 and two 64-point OFDM symbols are used for channel measurement (training) between each pair then the number of the required samples will be equal to 64×64×2×64=524288 samples (about 262 us for 2 GHz sample rate). The structure of the training signals for this case is schematically shown at 300 of FIG. 3 and includes 64-point OFDM symbol 330, 128 OFDM symbols 320, TX antenna beams 340 64 OFDM symbols 310 and RX antenna beams 350.

Figure 4:
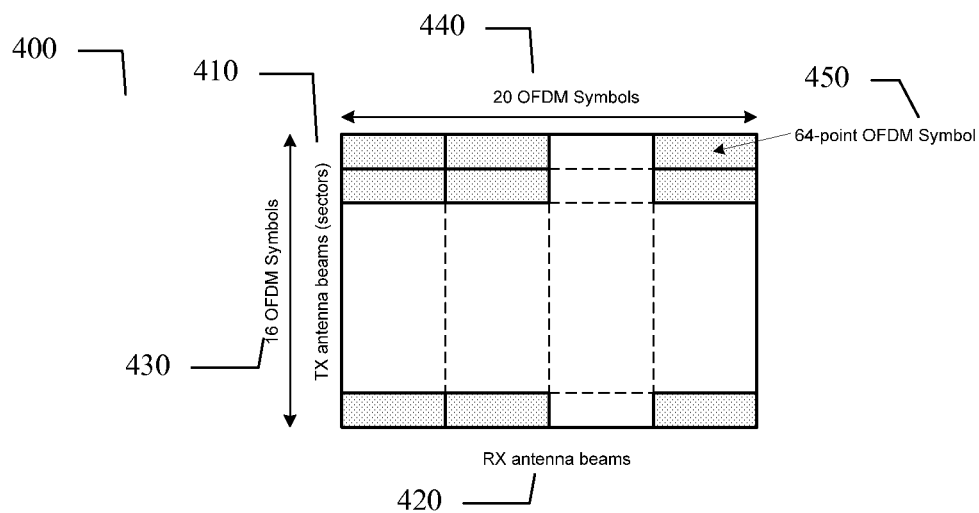
FIG. 4 illustrates a structure of the single training block for antenna system training according to one embodiment of the present invention.

It can be seen from the given example that the time required to perform the exhaustive beam searching can be quite large. For many practical cases the full extensive training between all TX-RX pairs may not be required and to reduce the total training time the training can be performed on a block-by-block basis with decision feedback from RX to TX about usefulness of the further training stages (further link improvement). For instance, for the considered example the block of 16×40 OFDM symbols may transmitted as it is schematically shown generally as 400 of FIG. 4 and the decision to continue training is made by the RX after that. FIG. 4 depicts TX antenna beams 410, 20 OFDM symbols 440, 64-point OFDM symbol 450, 16 OFDM symbols 430 and RX antenna beams 420. After the end of one training block, the RX feedbacks in low-rate mode about the further actions. The feedback information which is fed back to the TX by the RX may include (but is not limited to):

1. Decision to continue training or to stop training (if the required link quality is achieved).
2. Indices of the TX antenna system inputs (TX antenna beams) to be used for the next stage of the training if the decision was made to continue training. The RX may ask to use the previous TX antenna system inputs (TX antenna beams), to indicate the indices of the TX antenna system inputs to be used for the next stage or to ask TX to select the new TX antenna system inputs for the next stage of the training.
3. Optimal TX antenna weight vector $u_{opt}$ to be applied at the TX if the decision was made to finish training.

Figure 5:
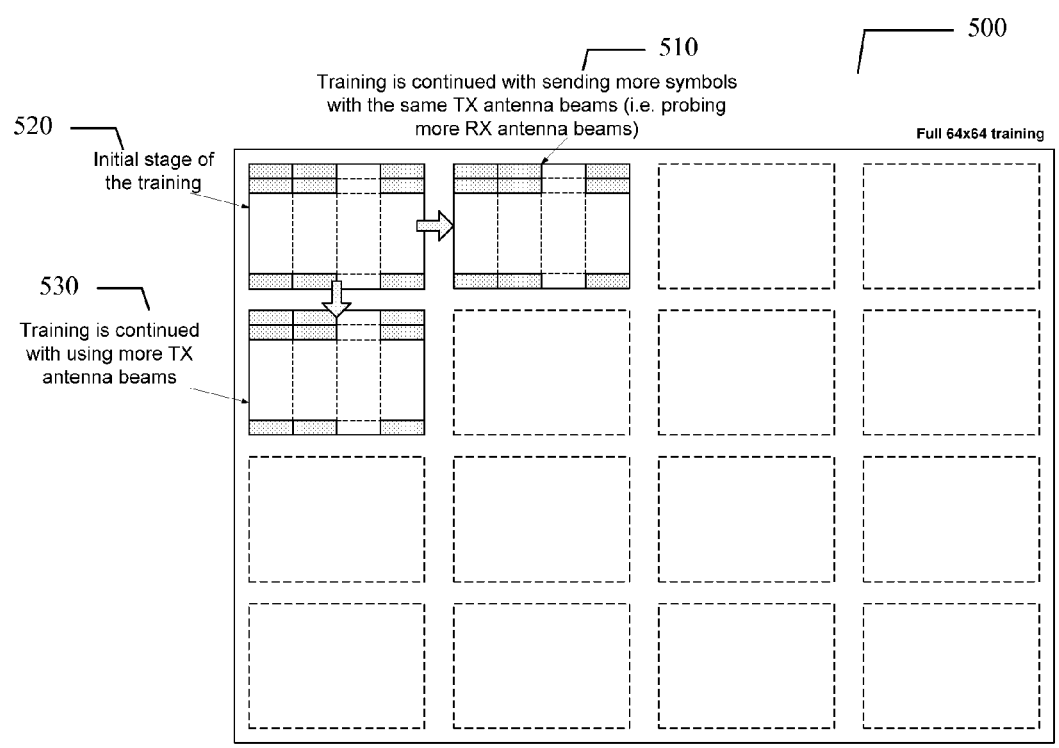
FIG. 5 illustrates a structure of the training consisting of the multiple blocks (stages) according to one embodiment of the present invention.

The structure of training consisting of the multiple stages (blocks) is shown at 500 of FIG. 5, wherein initial stage of the training is shown at 520 and training is continued with sending more symbols with the same TX antenna beams at 510, and training is continued using more TX antenna beams at 530. The number of the training stages will depend on the algorithm convergence. There will be only a few stages required for most of the practical cases while the full long training will also be possible for some specific cases which may occur rarely.

Signal Processing for Beamforming

Figure 6:
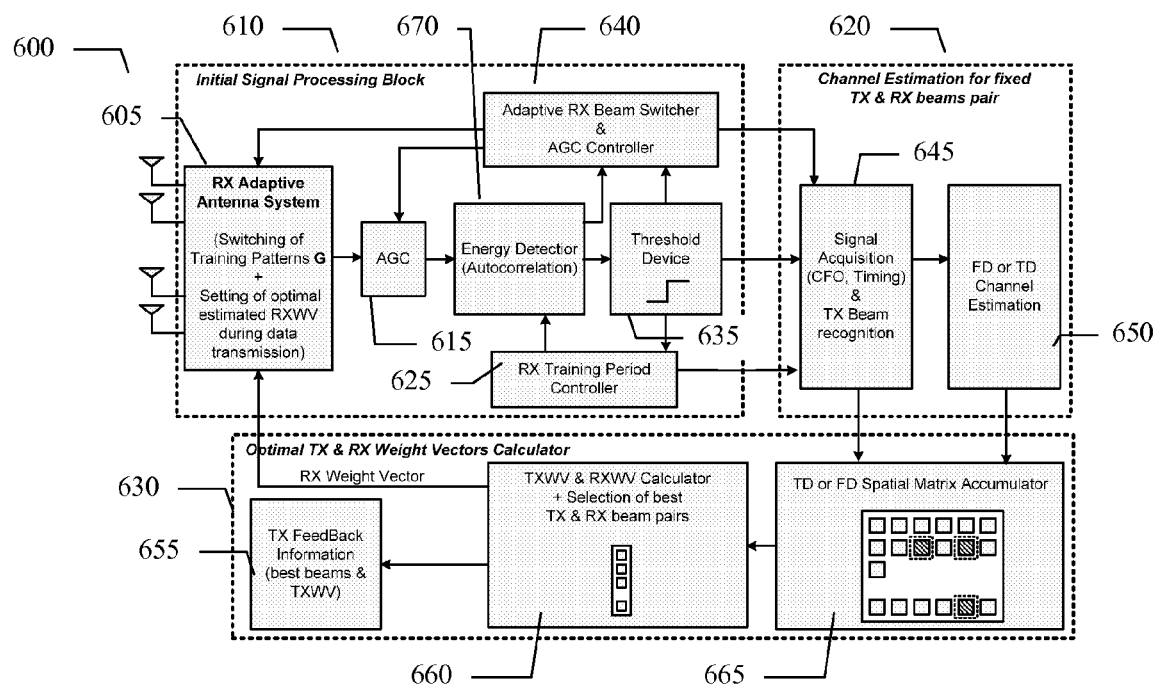
FIG. 6 illustrates a block diagram of the signal processing scheme used by the RX station for beamforming procedures according to one embodiment of the present invention.

The block diagram of the signal processing performed by the RX station during beamforming training is shown generally as 600 of FIG. 6 and includes initial signal process block 610, channel estimation for fixed TX and RX beams pair 620 and optimal TX and RX weight vectors calculator. Signal process block 610 may include RX adaptive antenna system 605, adaptive RX beam switcher and AGC controller 640, AGC 615, Energy detector 670, threshold device 635 and RX training period controller 625. Channel estimation for fixed and TX and RX beams pair may include signal acquisition and TX beam recognition 645 and FD or TD channel estimation 650. Optimal TX and RX weight vectors calculator may include TX feedback information 655, TXWV and RXWV calculator and selection of best TX and RX beam pairs, and TD or FD spatial matrix accumulator 665. When TX starts transmission of the training signals, RX starts detection of the transmitted signal by using autocorrelation (or other simple signal detection algorithm). If the detected energy is above some predefined threshold, then the RX station starts a channel estimation procedure to perform channel measurements. The channel estimation procedure may be started immediately or it can be postponed until the next training block (stage). If the signal energy was not detected for the given combination of the TX and RX antenna beams, then RX station may quickly switch to the other RX antenna beam (RX antenna system output).

Then the RX station decides that the found successful combinations of the TX and RX antenna beams are sufficient for data transmission and no more training stages (blocks) are required then RX station calculates optimal TX antenna weight vector $u_{opt}$ and feeds it back to the TX station for application and start of the data transmission.

Beam Tracking

The quality of the beam-formed transmission may become worse during the data transmission due to a non-stationary environment and the beam tracking procedure may be used to adjust the TX and RX antenna weight vectors without starting the whole initial beamforming procedure described above.

The beam tracking is done by sending the training signal at the end of the data packet if the beam tracking procedure is requested by RX. The structure of the beam tracking procedure is similar to the structure of one block of the initial beamforming procedure though the number of the TX beams and duration of the training signal transmitted for every TX beam may be different. The TX beams transmitted during the beam tracking procedure are selected by the TX (close to the previously used weight vector) and the RX makes signal processing similar to the signal processing done in the initial beamforming mode. After the updated antenna weight vector is calculated it is sent to the TX in an acknowledgment or a separate packet.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for communicating in a wireless personal area network, comprising:

using adaptive beamforming configured for a low-rate mode for reliable low-rate communications and a high-rate mode for high-rate communications; and using a fast algorithm to perform antenna beamforming for said high rate mode, wherein said fast algorithm includes training performed on a block-by-block basis with decision feedback from a receiver (RX) to a transmitter (TX) about the usefulness of further training stages;

wherein said training is performed using the TX and RX elementary antenna patterns or beams, where said patterns are composed using the transmit and receive beamforming matrices and wherein these matrices can be non-singular matrices including identity, Butler and Hadamard type matrices; and wherein during the antenna beamforming training, the training signal is transmitted using only one TX elementary antenna pattern at one time, but where after the final beamforming is completed, the data frames may be transmitted using a weighted combination of two or more TX elementary antenna patterns.

2. The method of claim 1, wherein said training includes a training signal for antenna beamforming that is a time-domain generated signal with good autocorrelation properties and a channel matrix estimation that is done in the time domain.

3. The method of claim 1, wherein said training includes a training signal for antenna beamforming that is a frequency domain generated OFDM signal and a channel matrix estimation that is done in the frequency domain.

4. The method of claim 1, wherein the index of the TX elementary antenna pattern used for training is encoded into the training signal and different training signals may be used for different TX elementary antenna patterns, so that the RX is able to determine the index of the TX elementary antenna pattern used for specific time slot.

5. The method of claim 1, wherein said feedback information which is fed back to the TX by the RX includes:
decision to continue training or to stop training;
indices of the TX elementary antenna patterns to be used for the next stage of the training if the decision was made to continue training; or
optimal TX antenna weight vector to be applied at the TX if the decision was made to finish training.

6. The method of claim 5, further comprising said RX requesting to use the previous TX elementary antenna patterns or requesting to use the specified (given by the RX) indices of the TX elementary antenna patterns for the next stage or requesting TX to select the new TX elementary antenna patterns for the next stage of the training.

7. The method of claim 1, further comprising using signal processing for said adaptive beamforming which includes:
when said TX starts transmission of training signals, said RX starts detection of said transmitted signal by using autocorrelation and if detected energy is above some predefined threshold, then said RX station starts channel estimation to perform channel measurements.

8. The method of claim 7, wherein said channel estimation procedure is started immediately or postponed until the next training block and if the signal energy was below a predetermined threshold for the given combination of the TX and RX antenna beams, then said RX station may quickly switch to the other RX antenna beam and wherein the RX station then decides that the found successful combinations of the TX and RX antenna beams are sufficient for data transmission and no more training stages are required, then said RX station calculates an optimal TX antenna weight vector and feeds it back to the TX station for application and start of the data transmission.

9. The method of claim 1, further comprising using a beam tracking procedure to adjust the TX and RX antenna weight vectors without starting the whole initial beamforming procedure.

10. The method of claim 9, wherein said beam tracking is done by sending the training signal at the end of the data packet if the beam tracking procedure is requested by RX and wherein the structure of the beam tracking procedure is similar to the structure of one block of the initial beamforming procedure though the number of the TX elementary antenna patterns (TX beams) and duration of the training signal transmitted for every TX beam may be different.

11. The method of claim 10, further comprising selecting by the TX the TX elementary antenna patterns (TX beams) transmitted during the beam tracking procedure and the RX makes signal processing similar to the signal processing done in the initial beamforming mode and wherein after the updated antenna weight vector is calculated, it is sent to the TX in an acknowledgment or a separate packet.

12. An apparatus, comprising:
a transmitter (TX) configured to communicate in a wireless personal area network using adaptive beamforming configured for a low-rate mode for reliable low-rate communications and a high-rate mode for high-rate communications; and
wherein said TX is configured to use a fast algorithm to perform antenna beamforming for said high rate mode, wherein said fast algorithm includes training performed on a block-by-block basis with decision feedback from a receiver (RX) to said transmitter (TX) about the usefulness of further training stages;
wherein said training is performed using the TX and RX elementary antenna patterns or beams, where said patterns are composed using the transmit and receive beamforming matrices and wherein these matrices can be non-singular matrices including identity, Butler and Hadamard type matrices; and
wherein during the antenna beamforming training, the training signal is transmitted using only one TX elementary antenna pattern at one time, but where after the final beamforming is completed, the data frames may be transmitted using a weighted combination of two or more TX elementary antenna patterns.

13. The apparatus of claim 12, wherein said training includes a training signal for antenna beamforming that is a time-domain generated signal with good autocorrelation properties and a channel matrix estimation that is done in the time domain.

14. The apparatus of claim 12, wherein said training includes a training signal for antenna beamforming that is a frequency domain generated OFDM signal and a channel matrix estimation that is done in the frequency domain.

15. The apparatus of claim 12, wherein the index of the TX elementary antenna pattern used for training is encoded into the training signal and different training signals may be used for different TX elementary antenna patterns, so that the RX is able to determine the index of the TX elementary antenna pattern used for specific time slot.

16. The apparatus of claim 12, wherein said feedback information which is fed back to said TX by said RX includes:
decision to continue training or to stop training;
indices of the TX antenna system inputs to be used for the next stage of the training if the decision was made to continue training; or
optimal TX antenna weight vector to be applied at the TX if the decision was made to finish training.

17. The apparatus of claim 16, further comprising said RX configured to request to use the previous TX antenna system inputs to indicate the indices of the TX antenna system inputs to be used for the next stage or to ask TX to select the new TX antenna system inputs for the next stage of the training.

18. A non-transitory computer readable medium encoded with computer executable instructions, which when accessed, cause a machine to perform operations comprising:
communicating in a wireless personal area network using adaptive beamforming configured for a low-rate mode for reliable low-rate communications and a high-rate mode for high-rate communications; and using a fast algorithm to perform antenna beamforming for said high rate mode, wherein said fast algorithm includes training performed on a block-by-block basis with decision feedback from a receiver (RX) to a transmitter (TX) about the usefulness of further training stages wherein said training is performed using the TX and RX elementary antenna patterns or beams, where said patterns are composed using the transmit and receive beamforming matrices and wherein these matrices can be non-singular matrices including identity, Butler and Hadamard type matrices; and wherein during the antenna beamforming training, the training signal is transmitted using only one TX elementary antenna pattern at one time, but where after the final beamforming is completed, the data frames may be transmitted using a weighted combination of two or more TX elementary antenna patterns.

19. The non-transitory computer readable medium of claim 18, wherein said training includes a training signal for antenna beamforming that is a time-domain generated signal with good autocorrelation properties and a channel matrix estimation that is done in the time domain.

20. The non-transitory computer readable medium of claim 18, wherein said training includes a training signal for antenna beamforming that is a frequency domain generated OFDM signal and a channel matrix estimation that is done in the frequency domain.

21. The non-transitory computer readable medium of claim 18, wherein the index of the TX elementary antenna pattern used for training is encoded into the training signal and different training signals may be used for different TX elementary antenna patterns, so that the RX is able to determine the index of the TX elementary antenna pattern used for specific time slot.

22. The non-transitory computer readable medium of claim 18, wherein said feedback information which is fed back to the TX by the RX includes:
    decision to continue training or to stop training;
    indices of the TX elementary antenna patterns to be used for the next stage of the training if the decision was made to continue training; or
    optimal TX antenna weight vector to be applied at the TX if the decision was made to finish training.

23. The non-transitory computer readable medium of claim 22, further comprising said instructions causing said machine to perform operations further comprising said RX requesting to use the previous TX elementary antenna patterns or requesting to use the specified (given by the RX) indices of the TX elementary antenna patterns for the next stage or requesting TX to select the new TX elementary antenna patterns for the next stage of the training.

24. The non-transitory computer readable medium of claim 19, further comprising said instructions causing said machine to perform operations further comprising using signal processing for said adaptive beamforming which includes:
    when said TX starts transmission of training signals, said RX starts detection of said transmitted signal by using autocorrelation and if detected energy is above some predefined threshold, then said RX station starts channel estimation to perform channel measurements.

* * * * *